(12) United States Patent
Sato

(10) Patent No.: US 11,774,379 B2
(45) Date of Patent: Oct. 3, 2023

(54) SOAKING MACHINE AND SOAKING METHOD OF SAMPLE FOR SINGLE-CRYSTAL X-RAY STRUCTURE ANALYSIS

(71) Applicant: Rigaku Corporation, Tokyo (JP)

(72) Inventor: Takashi Sato, Tokyo (JP)

(73) Assignee: Rigaku Corporation, Tokyo (JP)

( * ) Notice: Subject to any disclaimer, the term of this patent is extended or adjusted under 35 U.S.C. 154(b) by 279 days.

(21) Appl. No.: 17/295,862

(22) PCT Filed: Nov. 21, 2019

(86) PCT No.: PCT/JP2019/045699
§ 371 (c)(1),
(2) Date: May 20, 2021

(87) PCT Pub. No.: WO2020/105725
PCT Pub. Date: May 28, 2020

(65) Prior Publication Data
US 2022/0011248 A1 Jan. 13, 2022

(30) Foreign Application Priority Data
Nov. 23, 2018 (JP) ................................ 2018-219811

(51) Int. Cl.
*G01N 23/20* (2018.01)
*G01N 1/28* (2006.01)
(Continued)

(52) U.S. Cl.
CPC ......... *G01N 23/20033* (2013.01); *G01N 1/28* (2013.01); *G01N 23/20025* (2013.01); *G01N 23/207* (2013.01)

(58) Field of Classification Search
CPC .............. G01N 23/207; G01N 23/205; G01N 23/20025; G01N 23/20033; G01N 2223/604; G01N 1/28
See application file for complete search history.

(56) References Cited

U.S. PATENT DOCUMENTS 6,918,698 B2    7/2005   Nordmeyer et al.
7,274,769 B2    9/2007   Nordmeyer et al.
(Continued)

FOREIGN PATENT DOCUMENTS

JP   H06-194276 A   7/1994
JP   H11-304999 A   11/1999
(Continued)

OTHER PUBLICATIONS

European Patent Office, EP Search Report issued in EP Application No. 19 888 014.8, Munich Germany, dated Sep. 19, 2022, 8 pages.
(Continued)

*Primary Examiner* — Mark R Gaworecki
(74) *Attorney, Agent, or Firm* — ASLAN LAW, P.C.

(57) ABSTRACT

It is made possible to surely supply a porous complex crystal in which a sample is soaked, into a single-crystal X-ray structure analysis apparatus. There is provided a soaking machine for soaking a sample, comprising a supply section that supplies the sample to the porous complex crystal held by a sample holder 310, a temperature control section that controls a temperature of the porous complex crystal, a drive section that drives the supply section, and a control section that controls the supply section, the temperature control section and the drive section. The supply section supplies the sample to the porous complex crystal held by the sample holder 310 inside the applicator 311; and the temperature control section controls the temperature of the porous com-
(Continued)

plex crystal held by the sample holder 310, inside the applicator 311 into which the sample is supplied.

18 Claims, 12 Drawing Sheets

(51) Int. Cl.
*G01N 23/20033* (2018.01)
*G01N 23/20025* (2018.01)
*G01N 23/207* (2018.01)

(56) References Cited

U.S. PATENT DOCUMENTS

| | | |
|---|---|---|
| 7,696,991 B2 | 4/2010 | Higashi |
| 10,190,952 B2 | 1/2019 | Fujita et al. |
| 10,684,198 B2 | 6/2020 | Fujita et al. |
| 2003/0152194 A1 | 8/2003 | Nordmeyer et al. |
| 2005/0163280 A1 | 7/2005 | Nordmeyer et al. |
| 2007/0005268 A1 | 1/2007 | Higashi |
| 2007/0228049 A1 | 10/2007 | Nordmeyer et al. |
| 2015/0219533 A1 | 8/2015 | Fujita et al. |
| 2017/0219500 A1 | 8/2017 | Fujita et al. |
| 2019/0137367 A1 | 5/2019 | Fujita et al. |

FOREIGN PATENT DOCUMENTS

| | | |
|---|---|---|
| JP | 2003-083412 A | 3/2003 |
| JP | 2007-003394 A | 1/2007 |
| JP | 2013-156218 A | 8/2013 |
| JP | WO 2014/038220 A1 | 3/2014 |
| JP | 2014-130063 A | 7/2014 |
| JP | WO 2016/017770 A1 | 7/2017 |
| JP | 2018-155680 A | 10/2018 |
| WO | WO 2011/115223 A1 | 9/2011 |
| WO | WO 2015/132909 A1 | 9/2015 |

OTHER PUBLICATIONS

Yasuhide Inokuma, Makoto Fujita et al; "X-ray analysis on the nanogram to microgram scale using porous complexes"; Nature 495, 461-466; Mar. 28, 2013.
Hoshino et al., "The crystalline sponge method updated", IUCrJ, (2016), 3, 139-151.
猪熊泰英、常識を覆す結晶構造解析「結晶スポンジ」法化学 Yasuhide Inokuma, "'Crystal sponge' method overturns common sense of crystal structure analysis", Chemistry, vol. 68, No. 8, pp. 35-40, in particular, p. 39, fig.5, non-officieal translataion, Aug. 1, 2013.
猪熊泰英、「結晶スポンジ法による極小量化合物 のX線結晶構造解析」 Inokuma, Yasuhide et al., "X-ray crystallography of extremely small amount of compounds by crystal sponge method", Farumashia , 2014, vol. 50, No. 8, pp. 756-761, Column "5. Application of crystal sponge method", fig. 4, non-official translation.
Japan Patent Office, JP Office Action issued in JP Application No. 2020-557651, Japan, dated Feb. 28, 2023, 3 pages.

SOAKING MACHINE AND SOAKING METHOD OF SAMPLE FOR SINGLE-CRYSTAL X-RAY STRUCTURE ANALYSIS

CROSS-REFERENCE TO RELATED APPLICATIONS

This application claims priority to JP Patent Application No. 2018-219811 filed on Nov. 23, 2018, and this application claims priority to and is a 371 of international PCT Application No. PCT/JP2019/045699 filed on Nov. 21, 2019, the entire contents of which are hereby incorporated by reference.

TECHNICAL FIELD

The present invention relates to a soaking machine for which an analysis sample used for single-crystal X-ray structure analysis is prepared, and to a method thereof; and specifically to a soaking machine of a sample for X-ray structure analysis, that is suitable for being soaked in a crystalline sponge attached to part of a sample holder used in a single-crystal X-ray structure analysis apparatus proposed in connection with the present invention, and to a soaking method thereof.

BACKGROUND ART

In research and development for new devices and materials, the materials are ordinarily synthesized and evaluated to determine the next research policy based on the foregoing. In a structure analysis of a material using X-ray diffraction for performing material development in a short period of time, a search method of a material structure centering on the material structure analysis capable of efficiently performing the structure analysis, and an X-ray structure analysis used therein are indispensable for efficiently searching the material structure that realizes the function/physical property of an object material.

However, it has been difficult for those other than X-ray specialists to perform the structure analysis based on the results obtained by the foregoing method. Therefore, an X-ray structure analysis system with which the structure analysis can be performed by anyone who is not even a specialist of X-rays has been demanded. In this regard, as is known from the following Patent Document 1, the single-crystal X-ray structure analysis has gained attention as a method capable of catching a precise and highly accurate three-dimensional structure of molecules.

On the other hand, in this single-crystal X-ray structure analysis, there has been such a large constraint that a single-crystal needs to be prepared by crystallizing a sample. However, as is also known from the following Non-Patent Documents 1 and 2, and further, as is also known from patent document 2, the single-crystal X-ray structure analysis becomes widely applicable for those including a liquid compound that cannot be crystallized, a sample incapable of acquiring a sufficient amount for crystallization, and so forth via development of a material called "crystalline sponge" (for example, a porous complex crystal in which countless pores each having a diameter of 0.5 to 1 nm are formed).

In the field of single-crystal X-ray structure analysis, when analyzing a single-crystal sample with a single-crystal X-ray structure analysis apparatus to determine a crystal structure of the single-crystal, it is difficult to prepare the single-crystal sample to be analyzed, and skillfulness via experience and intuition was further required for determining the crystal structure of the single-crystal from data obtained by analyzing the single-crystal sample to be analyzed thereof with the single-crystal X-ray structure analysis apparatus; and thus this was able to be only performed by a very limited number of persons.

On the other hand, with progress in technology and development of single-crystal X-ray structure analysis apparatus, even a person who is not skilled in crystal structure analysis technology would be able to analyze a single-crystal sample by the single-crystal X-ray structure analysis apparatus if the single-crystal sample could be only available, and thus in recent years, the crystal structure of the single-crystal sample has been able to be relatively easily determined.

Further, as a high molecular complex having at least 2 species of pore groups capable of selectively incorporating and/or releasing a specific compound ranging a small gaseous molecule to a large molecule such as a protein, a biogenic molecule or the like; in Patent Document 1, disclosed is the high molecular complex characterized by having at least 2 species of pore groups comprising mutually equal pores having unique affinity to a guest component in a three-dimensional lattice structure, that comprises a three-dimensional lattice structure including a stacked structure obtained by inserting the non-coordinating aromatic compound in between aromatic compound ligands, wherein the non-coordinating aromatic compound constituted from the stacked structure forms a main skeleton of the high molecular complex.

PRIOR ART DOCUMENT

Patent Document

Patent Document 1: Japanese Unexamined Patent Application Publication No. 2007-3394
Patent Document 2: Re-publication of PCT International Publication WO2016/017770

Non-Patent Document

Non-Patent Document 1: Makoto Fujita; X-ray analysis on the nanogram to microgram scale using porous complexes; Nature 495, 461-466; 28 Mar. 2013
Non-Patent Document 2: Hoshino et al. (2016), The updated crystalline sponge method IUCrJ, 3, 139-151

SUMMARY OF THE INVENTION

Problems to be Solved by the Invention

According to a conventional technique, as described in Non-Patent Document 1, the crystal structure of a single-crystal can be relatively easily determined by forming a very small and fragile crystalline sponge in which a plurality of fine pores are formed and soaking a sample inside the fine pores of this crystalline sponge to analyze this by a single-crystal X-ray structure analysis apparatus.

In order to perform analysis using this crystalline sponge by the single-crystal X-ray structure analysis apparatus, it becomes necessary to surely attach a sample made into a single-crystal, that is soaked inside the fine pores of the crystalline sponge and is formed therein, to a part (a tip of a goniometer head pin) of a sample holder used for performing analysis by the single-crystal X-ray structure analysis apparatus. However, neither a method for surely attaching a sample soaked to be formed in a very small and fragile crystalline sponge to a measurement position in a single-crystal X-ray structure analysis apparatus, nor an apparatus therefor is disclosed in the above-described conventional technique.

The present invention that solves the problems of the conventional technology as described above is to provide a soaking machine and a soaking method of a sample for single-crystal X-ray structure analysis that enable surely soaking an analysis sample in the very small and fragile crystalline sponge attached to the sample holder, and quickly and easily supplying the sample to the single-crystal X-ray structure analysis apparatus, by using the sample holder proposed in connection with the present invention.

Means to Solve the Problems (1) In order to achieve the above-described object, it is a feature that the soaking machine according to the present invention is a soaking machine for soaking a sample, comprising a supply section that supplies the sample to a porous complex crystal held by a sample holder, a temperature control section that controls a temperature of the porous complex crystal, a drive section that drives the supply section, and a control section that controls the supply section, the temperature control section and the drive section.

(2) Further, it is a feature that in the soaking machine according to the present invention, the sample holder is set in the soaking machine in a state where the sample holder is attached to an applicator; the supply section supplies the sample to the porous complex crystal held by the sample holder inside the applicator; and the temperature control section controls the temperature of the porous complex crystal held by the sample holder, inside the applicator into which the sample is supplied.

(3) Further, it is a feature that in the soaking machine according to according to the present invention, the supply section comprises an injection pipe through which the sample is injected into the applicator to which the sample holder is attached; the soaking machine further comprises a discharge section that discharges part of the sample from an inside of the applicator to which the sample holder is attached, through a discharge pipe; and the drive section drives the injection pipe and the discharge pipe to insert/eject the injection pipe and the discharge pipe to/from the inside of the applicator.

(4) Further, it is a feature that in the soaking machine according to the present invention, the drive section inserts the injection pipe to the applicator through a first through-hole formed in the sample holder, and inserts the discharge pipe to the applicator through a second through-hole formed in the sample holder.

(5) Further, it is a feature that in the soaking machine according to the present invention, the injection pipe and the discharge pipe each have a different insertion depth into the sample holder, from each other in a state where the injection pipe and the discharge pipe are inserted to the applicator.

(6) Further, it is a feature that in the soaking machine according to the present invention, a taper-shaped surface is formed at an end portion on a side where the injection pipe or the discharge pipe is inserted/ejected thereinto/therefrom, for each of the first through-hole and the second through-hole.

(7) Further, it is a feature that in the soaking machine according to the present invention, the applicator comprises a first seal part for sealing between the applicator and the sample holder; the drive section comprises a holding part that holds the injection pipe and the discharge pipe; and the holding part comprises a second seal part for sealing between the injection pipe and the sample holder, and a third seal part for sealing between the discharge pipe and the sample holder.

(8) Further, it is a feature that in the soaking machine according to the present invention, the holding part is formed from a holding block; and the inside of the applicator is made airtight by operating the first seal part, the second seal part and the third seal part while inserting the injection pipe and the discharge pipe that are held by the holding block, to the applicator, by driving the holding block in a direction approaching the sample holder with the drive section.

(9) Further, it is a feature that in the soaking machine according to the present invention, the first seal part, the second seal part and the third seal part are O-rings.

(10) Further, it is a feature that in the soaking machine according to the present invention, the O-rings that form the first seal part, the second seal part and the third seal part are pressed by pressing the holding part onto the sample holder with the drive section to secure air-tightness between the applicator and the sample holder, and between the sample holder and the holding part.

(11) Further, it is a feature that the soaking method according to the present invention is a soaking method for soaking a sample, the method comprising the steps of setting an applicator to which a sample holder that holds a porous complex crystal is attached, in a soaking machine; lowering a holding block that holds an injection pipe and a discharge pipe, with a drive section of the soaking machine to insert the injection pipe and the discharge pipe in a first through-hole and a second through-hole, respectively, that are formed in the sample holder, and exposing the injection pipe and the discharge pipe to a region surrounded by the sample holder and the applicator; pressing the holding block to the sample holder while pressing the sample holder to the applicator by further lowering the holding block with the drive section to secure air-tightness; supplying the sample into the region surrounded by the sample holder and the applicator, through the injection pipe, the region that is made airtight; controlling a temperature of the applicator to which the sample is supplied, with the temperature control section, depending on a type of the sample to soak the sample in the porous complex crystal; and discharging, from the region surrounded by the sample holder and the applicator, the sample supplied thereto, through the discharge pipe.

(12) Further, it is a feature that in the soaking method according to the present invention; n the step of securing the air-tightness, the air-tightness between the sample holder and the applicator is secured by pressing the seal part attached onto a side of the applicator with the sample holder.

(13) Further, it is a feature that in the soaking method according to the present invention; in the step of securing the air-tightness, the air-tightness by sealing between the holding block and the sample holder is secured by pressing the seal parts attached to a region where the injection pipe is surrounded and another region where the discharge pipe is surrounded on the holding block side, onto the sample holder.

Effect of the Invention

According to a soaking machine of a sample for single-crystal X-ray structure analysis of the present invention, it is made possible to surely soak a sample in a porous complex crystal that is a very small and fragile crystalline sponge held by a sample holder in a single-crystal X-ray structure analysis apparatus.

DETAILED DESCRIPTION OF EMBODIMENTS

Figure 1:
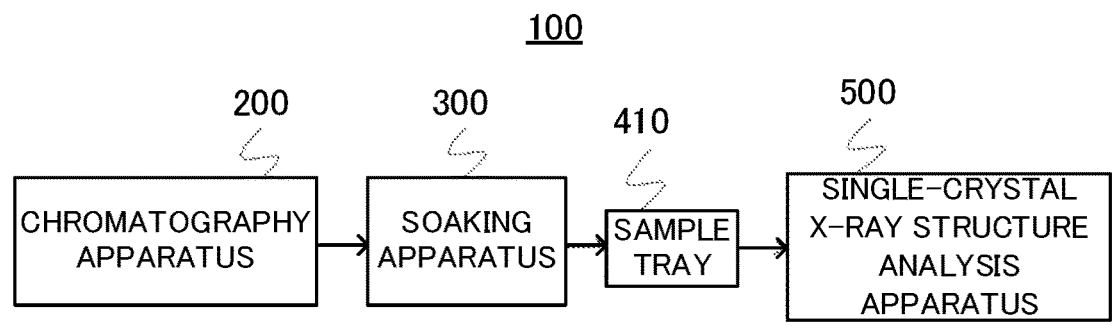
FIG. 1 is a block diagram showing an outline configuration of the entire system of a single-crystal X-ray structure analysis apparatus comprising a soaking machine of a sample for X-ray structure analysis according to Example of the present invention.

Next, a soaking machine of a sample for single-crystal X-ray structure analysis used for a single-crystal X-ray structure analysis apparatus, that is capable of surely performing supplying thereto as a sample holder in the single-crystal X-ray structure analysis apparatus to soak an analysis sample in a sponge-shaped material (crystalline sponge, or porous complex crystal); and a soaking method thereof according to the present invention are described referring to the drawings. In addition, the expression of "A or B" according to the present application means "at least one of A and B", and comprises "A and B" unless there are exceptional circumstances where there exists no possibility of A and B.

FIG. 1 shows an outline configuration of the entire single-crystal X-ray structure analysis apparatus system 100 comprising a soaking machine of a sample for X-ray structure analysis according to the present Example. The single-crystal X-ray structure analysis system 100 relating to the preset Example comprises a chromatography apparatus 200 that extracts an analysis object sample from inside a sample such as a gas sample, a liquid sample or the like; a soaking machine 300 for a single-crystal X-ray structure analysis apparatus (hereinafter, also referred to simply as a soaking machine 300), that prepares a sample for single-crystal X-ray structure analysis from the sample obtained via extraction thereof with the chromatography apparatus 200; a sample tray 410 in which single-crystal X-ray structure analysis samples each prepared by the soaking machine 300 are stored and moved; and a single-crystal X-ray structure analysis apparatus 500 that analyzes each of the samples stored in the sample tray 410, using X-rays.

In addition, the sample may be made to singly move from the soaking machine 300 to the single-crystal X-ray structure analysis apparatus 500 without using the sample tray 410.

Figure 2:
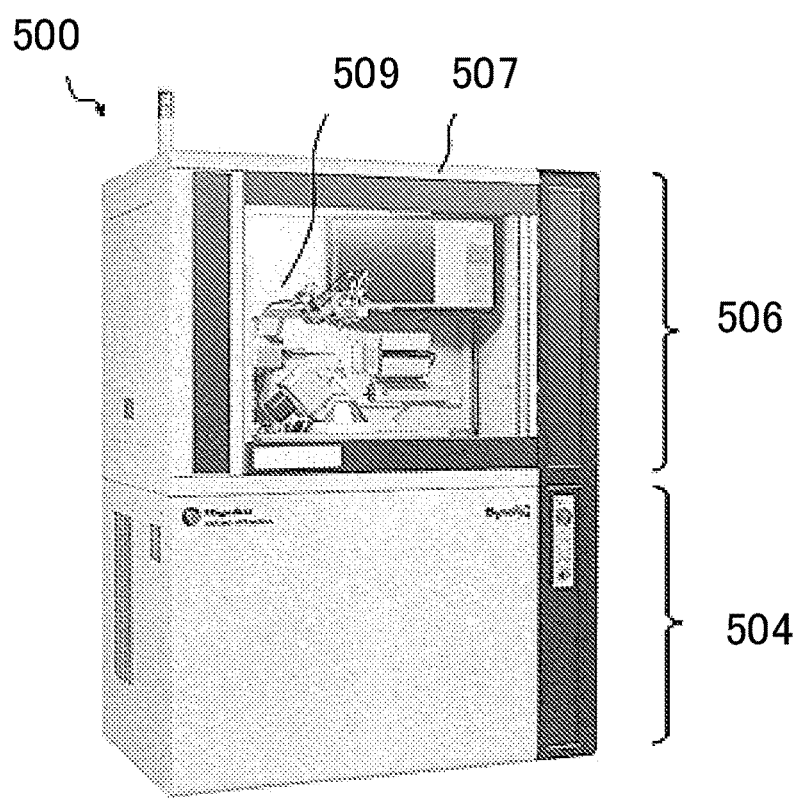
FIG. 2 is a perspective view showing a system appearance configuration of the above-described single-crystal X-ray structure analysis apparatus.

The attached FIG. 2 shows the entire appearance configuration of the single-crystal X-ray structure analysis apparatus comprising a single-crystal X-ray diffractometer according to one embodiment of the present invention, and as is clear from the figure, the single-crystal X-ray structure analysis apparatus 500 comprises a base stand 504 in which a cooling device and an X-ray generation power supply unit are stored, and an X-ray protection cover 506 placed on the base stand 504.

The X-ray protection cover 506 is provided with a casing 507 for surrounding the single-crystal X-ray diffractometer 509, a door provided in front of the casing 507, and so forth. The door provided in front of the casing 507 is openable, and in this open state, various operations can be performed for the internal single-crystal X-ray diffractometer 509. In addition, the present embodiment as shown in the figure is directed to the single-crystal X-ray structure analysis apparatus 500 provided with the single-crystal X-ray diffractometer 509 for performing a structure analysis of a material using the crystalline sponge mentioned below.

Figure 3:
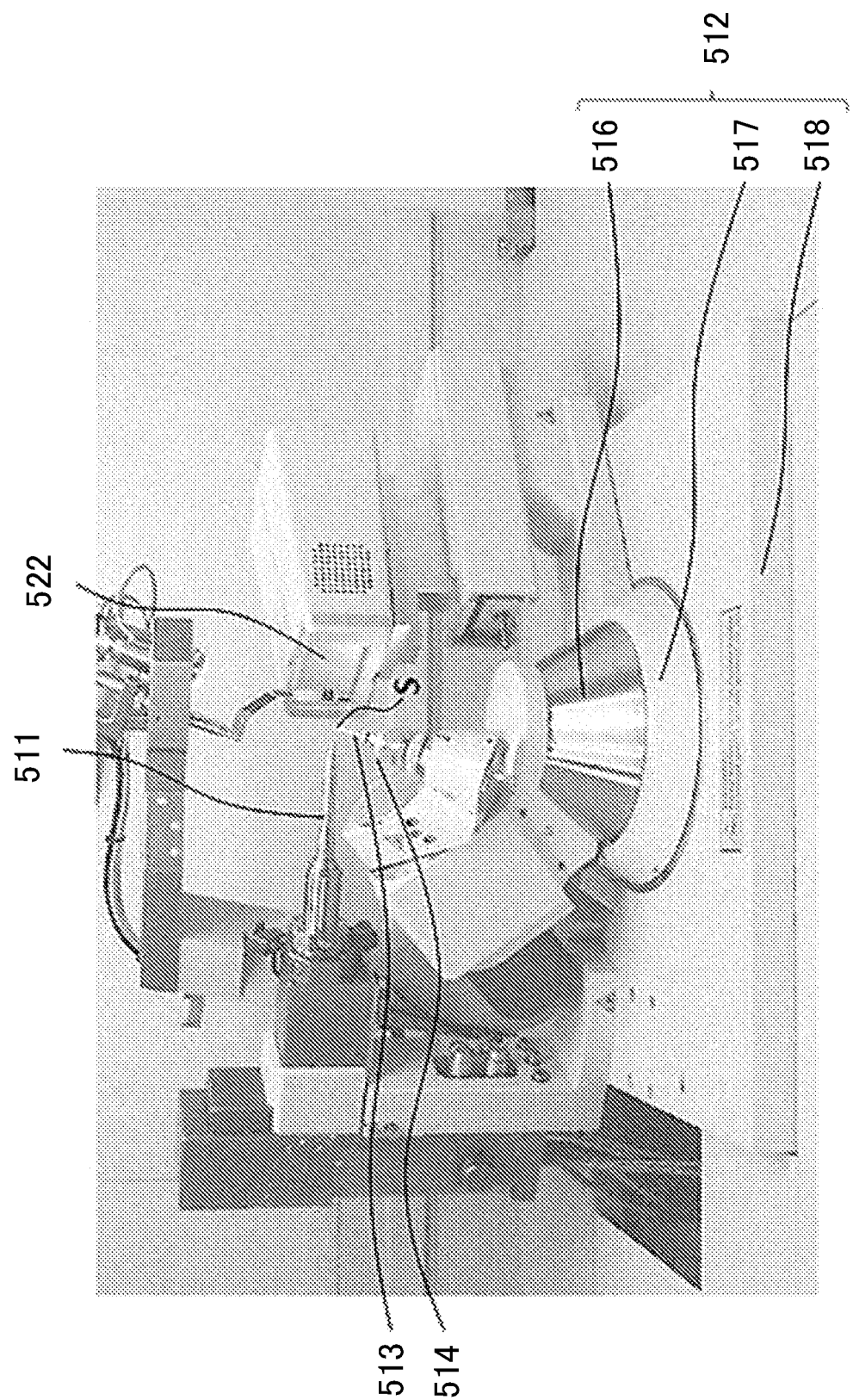
FIG. 3 is a perspective view showing a configuration of a measurement section in the above-described single-crystal X-ray structure analysis apparatus.

The single-crystal X-ray diffractometer 509 comprises an X-ray tube 511 and a goniometer 512, as shown in FIG. 3 as well. The X-ray tube 511 comprises a filament, a target (referred to also as "anticathode") arranged so as to be opposed to the filament, and a casing for airtightly storing them, though not shown in the figure herein. This filament subjected to current applied by the X-ray generation power supply unit stored in the base stand 504 of FIG. 2 generates heat to emit thermal electrons.

Further, a high voltage is applied between the filament and the target by the X-ray generation power supply unit, and the thermal electrons emitted from the filament are accelerated by the high voltage, and collide with the target. This collision area forms an X-ray focus, and X-rays are generated from the X-ray focus, and are spread out. In more detail, though not shown in the figure herein, the X-ray tube 511 comprising a microfocus tube and an optical element such as a multilayer focusing mirror or the like enables irradiation with higher brightness beam, and can also be selected from a radiation source such as Cu, Mo, Ag or the like. As exemplified above, the filament, the target arranged so as to be opposed to the filament, and the casing for airtightly storing them serve as an X-ray source, and a configuration for X-ray irradiation comprising the microfocus tube and the optical element such as the multilayer focusing mirror or the like serves as an X-ray irradiation section.

Further, a goniometer 512 supporting a sample S to be analyzed comprises a θ rotation table 516 that is rotatable with a sample axis line ω passing through an X-ray incident point of the sample S as a center, and a 2θ rotation table 517 that is arranged around the θ rotation table and is rotatable with the sample axis line ω as a center. A goniometer head 514 onto which the sample S is attached is provided to the goniometer 512. In addition, according to the present embodiment, the sample S is soaked inside a crystalline sponge previously attached to a part of the sample holder 513 mentioned below.

Drive devices (not shown in the figure) for driving the above-described θ rotation table 516 and 2θ rotation table 517 are stored inside a base 518 of the goniometer 512, and the θ rotation table 516 is driven by these drive devices to be intermittently or continuously rotated at a predetermined angular speed so as to make a so-called θ rotation. Further, the 2θ rotation table 517 is driven by these drive devices to be intermittently or continuously rotated so as to make a so-called 2θ rotation. The above-described drive devices can be constituted from any structure, and for example, can be constituted from a power transmission structure comprising a worm and a worm wheel.

An X-ray detector 522 is placed on a part of the outer periphery of the goniometer 512, and the X-ray detector 522 is constituted from for example, CCD type and CMOS type two-dimensional pixel detectors, a hybrid type pixel detector, or the like. In addition, an X-ray detection measurement section means a configuration in which X-rays diffracted or scattered by the sample are detected and measured, and comprises the X-ray detector 522 and a control section that controls the same.

The single-crystal X-ray diffractometer 509 is constituted as described above, and thus the sample S is θ-rotated with the sample axis line ω as a center by the θ rotation of the θ rotation table 516 in the goniometer 512. During the θ rotation of this sample S, X-rays generated from the X-ray focus inside the X-ray tube 511, that is directed to the sample S enter the sample S at a predetermined angle, and are diffracted/scattered. That is, the incident angle of X-rays entering the sample S changes depending on the θ rotation of the sample S.

When the Bragg diffraction condition between an incident angle of X-rays entering the sample S and a crystal lattice plane is satisfied, diffraction X-rays are generated from the sample S. The diffraction X-rays are received by the X-ray detector 522 to measure an X-ray intensity thereof. From those described above, an angle of the X-ray detector 522 with respect to the incident X-rays, that is, an intensity of the diffraction X-rays corresponding to a diffraction angle is measured, and a crystal structure concerning the sample S and so forth are analyzed from this measurement result.

Figure 4A:
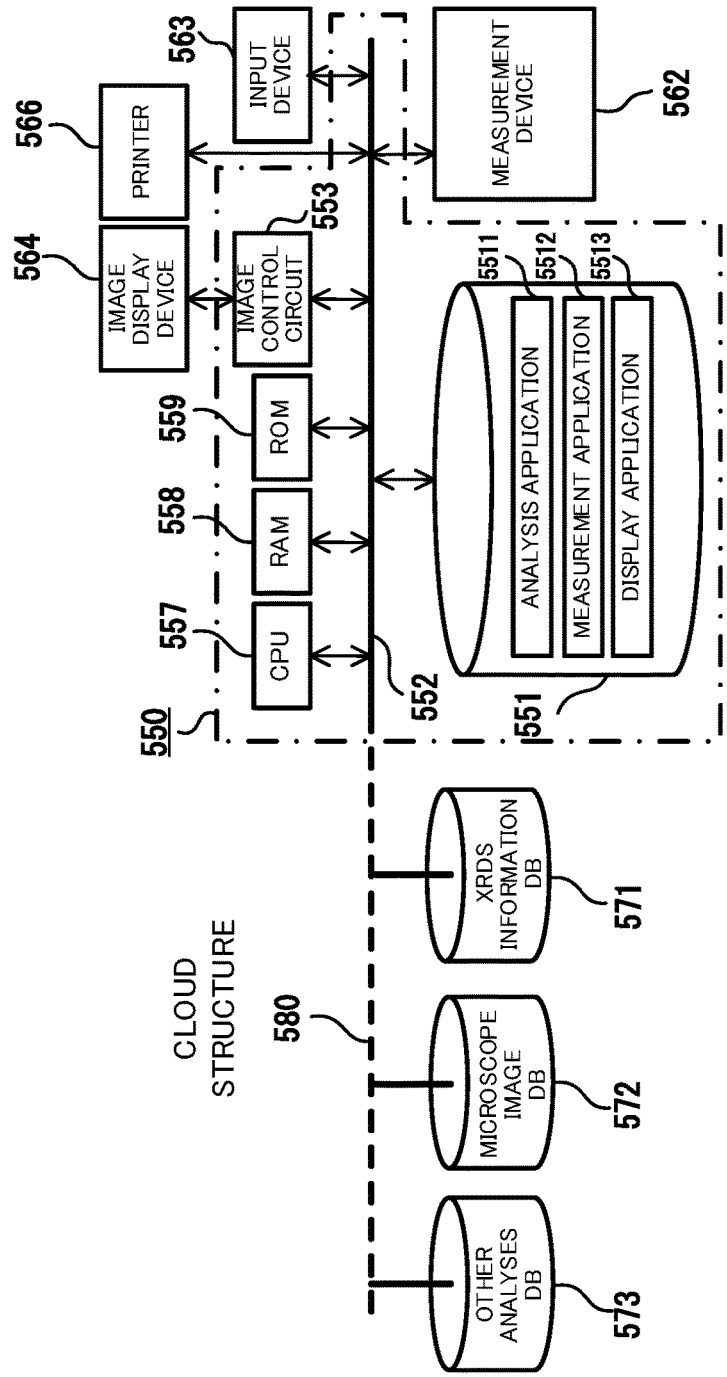
FIG. 4A is a block diagram showing one example of the detail of an electrical internal configuration of the above-described single-crystal X-ray structure analysis apparatus.

Next, FIG. 4A shows one example of the detail of an electrical internal configuration constituting a control section 550 in the above-described single-crystal X-ray structure analysis apparatus 500. In addition, as a matter of course, the present invention is not limited to the following embodiments according to the present invention.

This single-crystal X-ray structure analysis apparatus 500 includes the above-described internal configuration and further comprises a measurement device 562 for measuring a suitable material used as a sample; an input device 563 constituted from a keyboard, a mouse and so forth; an image display device 564 as display means; a printer 566 as means for printing and outputting the analysis result; CPU (Central Processing Unit) 557; RAM (Random Access Memory) 558; ROM Read Only Memory) 559; a hard disk as an external storage medium, and so forth. These elements are mutually connected by a bus 552.

The image display device 564 constituted from an image display unit such as a CRT display, a liquid-crystal display or the like displays an image on a screen in accordance with an image signal generated by an image control circuit 553. The image control circuit 553 generates the image signal based on image data input therein. The image data input in the image control circuit 553 is generated by an operation of every kind of calculation means, achieved by a computer that includes an analysis section 551 comprising CPU 557, RAM 558, ROM 559, and a hard disk.

An inkjet plotter, a dot printer, an inkjet printer, an electrostatic transfer printer, or any other printing unit having arbitrary structure is usable for the printer 566. In addition, the analysis section 551 can also constitute from a magneto-optical disk, a semiconductor memory, or any other storage medium having arbitrary structure other than the hard disk.

Analysis application software 5511 for managing the overall operation of the single-crystal X-ray structure analysis apparatus 500, measurement application software 5512 for managing the operation of the measurement processing using the measurement device 562, and display application software 5513 for managing the operation of the display processing using the image display device 564 are stored inside the analysis section 551 for performing structure analysis processing of the single-crystal by providing the hard disk. A predetermined function is achieved after reading these pieces of application software from the hard disk in the analysis section 551, as needed, to transfer them to RAM 558.

This single-crystal X-ray structure analysis apparatus 500 further comprises for example, a database placed in a cloud area, the database for storing every kind of measurement results including measurement data obtained by the above-described measurement device 562. Referring to an example of the figure, as is explained below, shown are an XRDS information database 571 that stores XRDS image data obtained by the above-described measurement device 562, and a microscope image database 572 that stores actually observed images obtained by the microscope, and further shown are for example, measurement results obtained via analysis performed with XRF, not X-rays but Raman ray or the like, and another analysis database 573 that stores physical property information. In addition, these databases are not necessarily stored inside the single-crystal X-ray structure analysis apparatus 500, and for example, they may be provided outside and be communicably connected mutually via a network 580 or the like.

Figure 4B:
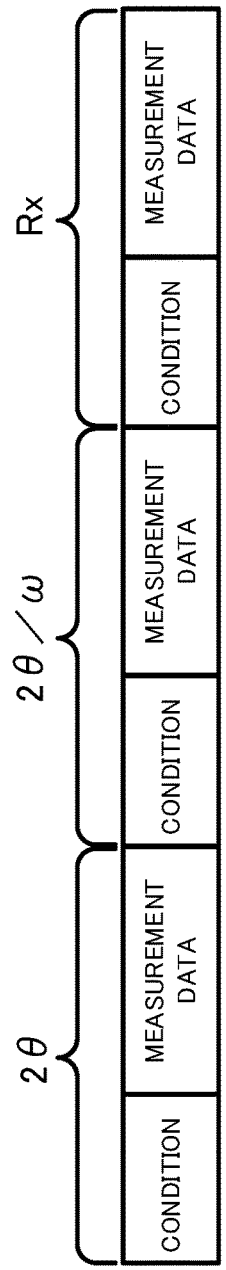
FIG. 4B is a diagram showing a data file configuration for storing a plurality of pieces of measurement data inside the electrical internal configuration of the above-described single-crystal X-ray structure analysis apparatus.

A method of storing individual measurement data inside an individual file is also taken into account as a file management method for storing a plurality of pieces of measurement data inside a data file, but according to the present embodiment, as shown in FIG. 4B, the plurality of pieces of measurement data are set to be continuously stored inside one data file. In addition, referring to FIG. 4B, storage areas each in which "condition" is written are an area for storing every kind of information including device information and measurement conditions when obtaining the measurement data.

As such measurement conditions, (1) name of measurement object material, (2) type of measurement device, (3) measurement temperature range, (4) measurement start time, (5) measurement end time, (6) measurement angle range, (7) moving speed in scanning movement system, (8) scanning condition, (9) type of X-rays incident on sample, (10) whether or not to use attachments such as a sample high-temperature device, and so forth, are conceivable and every kind of other conditions is also conceivable.

Figure 5:
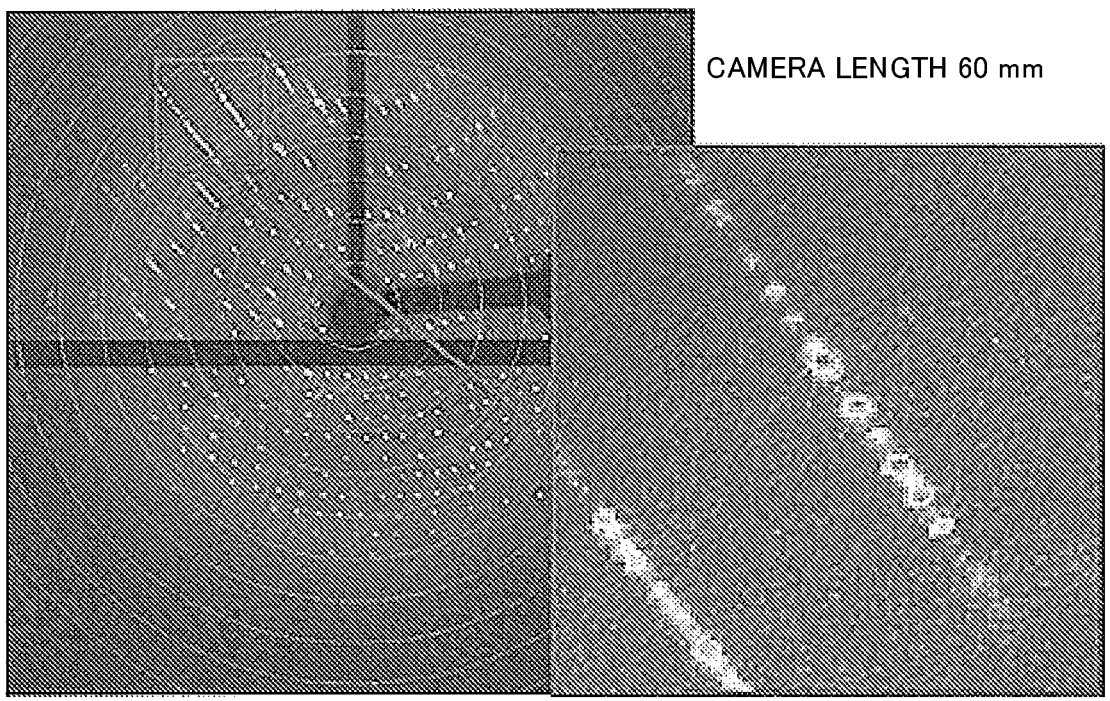
FIG. 5 is a front view showing an image of an XRDS pattern observed by the above-described single-crystal X-ray structure analysis apparatus.

An XRDS (X-ray Diffraction and Scattering) pattern or an image (Refer to FIG. 5) is obtained by receiving/accumulating X-rays received on a flat plane that is a two-dimensional space of the X-ray detector 522 constituting the above-described measurement device 562 for each pixel arranged in planar array (for example, CCD or the like), that constitutes the detector, and by measuring an intensity thereof. For example, a pattern or an image on a two-dimensional space of r and θ can be obtained by detecting the intensity of X-rays received via an integral, for each pixel of the X-ray detector 522.

<Measurement Application Software>

The XRDS pattern or the image on an observation space, that is obtained by diffraction and scattering of X-rays caused by an object material for irradiation of the X-rays reflects information of an electron density distribution in an actual space of the object material. However, the XRDS pattern being on the two-dimensional space of r and θ does not directly represents symmetry in the actual space of the object material as a three-dimensional space. Accordingly, it is generally difficult to specify the (spatial) arrangement of atoms and molecules that constitute the material with only the existing XRDS image, and thus a specialized knowledge of X-ray structure analysis is required. Therefore, according to the present Example, automatization is achieved by adopting the above-described measurement application software.

Figure 6A:
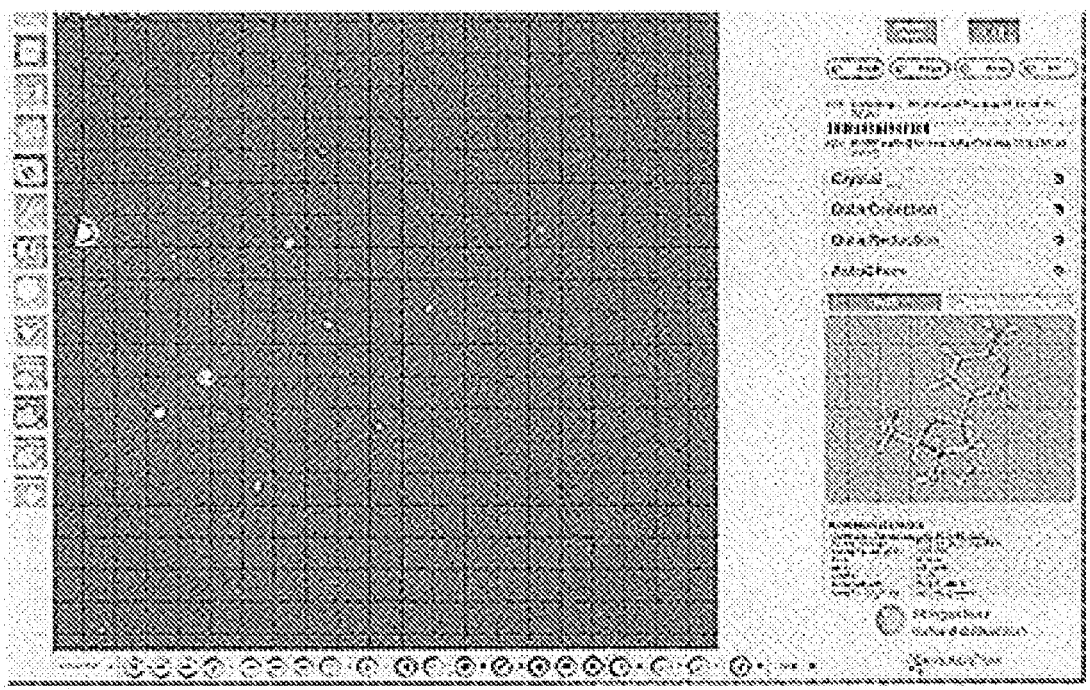
FIG. 6A is a front view showing an execution screen of an application software for the measurement of the above-described single-crystal X-ray structure analysis apparatus.
Figure 6B:
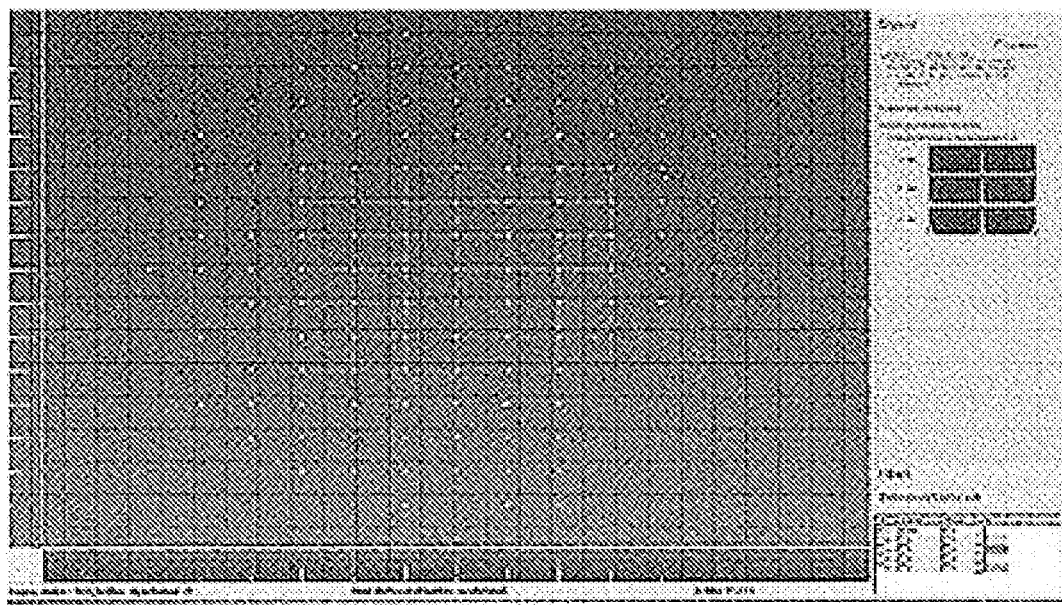
FIG. 6b is a front view showing another execution screen of an application software for the measurement of the above-described single-crystal X-ray structure analysis apparatus.
Figure 7:
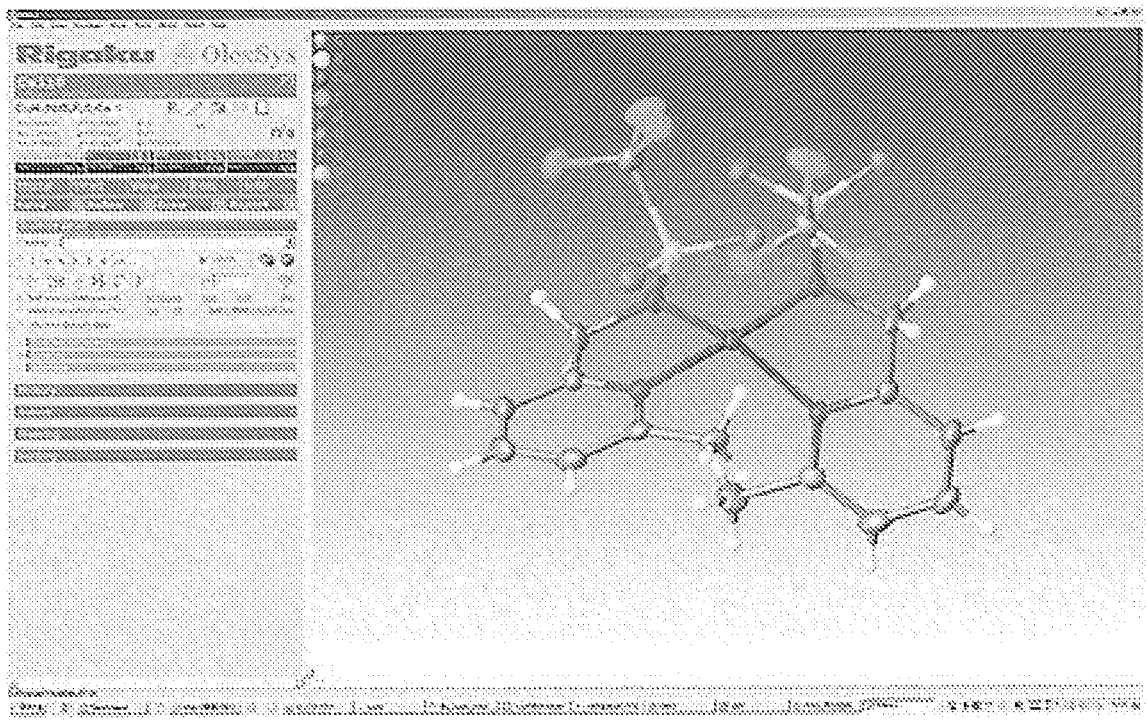
FIG. 7 is a front view of a screen displaying a molecular model prepared using a structure analysis program of the above-described single-crystal X-ray structure analysis apparatus.

For one example, as shown in the execution screens of FIGS. 6a and 6b, X-ray diffraction data measurement/processing software called "CrysAlis$^{Pro}$" that is a platform for single-crystal structure analysis is installed to execute preliminary measurement, setting of measurement conditions, main measurement, data processing and so forth. Further, structure analysis and structure refinement are executed in parallel with X-ray diffraction data collection by installing an automatic structure analysis plug-in called "AutoChem". Then, from space group determination to phase determination, construction and correction of molecular modelling, structure refinement, final reporting, and preparation of a CIF file are executed by a structure analysis program called "Olex$^2$" as also shown in FIG. 7.

The whole structure of the single-crystal X-ray structure analysis apparatus 500, and its function have been described as above, and a crystalline sponge according to the present invention, and devices and tools related thereto are specifically described below in detail, referring to the attached drawings.

<Crystalline Sponge>

As described above, the single-crystal X-ray structure analysis has become widely applicable for those including a liquid compound that cannot be crystallized, a very small amount of a sample with several ng to several μg that is incapable of acquiring a sufficient amount to perform crystallization, or the like via development of a material called "crystalline sponge" as a very small and fragile porous complex crystal having an approximate size of several 10 μm to several 100 μm, in whose inside countless pores each having a diameter of 0.5 to 1 nm are formed.

However, in the current situation, in order to perform soaking (post-crystallization) as crystallization of a sample into a framework of the above-described crystalline sponge, as previously described, required is a step of soaking a very small amount of a sample, approximately several ng to several μg, separated by every kind of pretreatment (separation) devices in a framework of a very small and fragile crystalline sponge having an outer diameter of approximately 100 μm provided via immersion in a preserving solvent (carrier) such as cyclohexane or the like, inside a container. Examples of the preserving solvent (carrier) include liquid, a gaseous body (gas), and a supercritical fluid in the middle of them. Subsequently, further required is a step of taking out, from a container, a very small, fragile and difficultly handleable crystalline sponge in a quick manner (in a short period of time in such an extent that the crystalline sponge is not broken due to drying), and accurately attaching it to an X-ray irradiation position inside a diffractometer, more specifically, to a tip portion of a sample axis of the goniometer 512 (so-called goniometer head pin) while performing centering.

These steps are not only fine operations for which high preciseness is required but also those for which rapidness is required for the operator, regardless of presence/absence of a specialized knowledge of X-ray structure analysis, thereby resulting in having a large influence on the measurement result of a sample after being soaked in the crystalline sponge. That is, these operations make single-crystal X-ray structure analysis using a very small crystalline sponge result in low yield, and thus this becomes one of the causes of suppressing the single-crystal X-ray structure analysis using the crystalline sponge from being widely used.

The present invention that has been accomplished based on the above-described inventor's knowledge enables quickly, surely and easily performing a single-crystal X-ray structure analysis with a very small and fragile crystalline sponge by using a sample holder for the crystalline sponge (also referred to simply as a sample holder) as described below, in other words, achieves a high-yield, efficient, very versatile and user-friendly single-crystal X-ray structure analysis apparatus.

That is, as to the next-generation single-crystal X-ray structure analysis apparatus according to the present invention, there is a large constraint that the very small and fragile crystalline sponge in which a very small amount of a sample S is soaked is prepared, and further the sample S (crystalline sponge) needs to be taken up from a soaking container and precisely and attached to a predetermined position at the tip portion of the goniometer, but specifically in order to achieve the very versatile and user-friendly apparatus, such operations need to be made quickly and easily executable without requiring highly specialized knowledge as well as operation precision (preciseness).

The present invention described below in detail resolves such a problem, that is, provides an apparatus and a method for performing a high-yield efficient, very versatile and user-friendly single-crystal X-ray structure analysis in a quick, sure and easy manner by anyone while also using a very small, fragile and difficultly handleable crystalline sponge; and further provides a sample holder as a tool therefor.

<Soaking Machine>

The configuration of a soaking machine 300 by which an analysis object sample is soaked in a crystalline sponge in a configuration of a single-crystal X-ray structure analysis system 100 comprising a single-crystal X-ray structure analysis apparatus 500 relating the first Example according to the present invention as shown in FIG. 1 is described referring to FIGS. 8 to 16.

Figure 8:
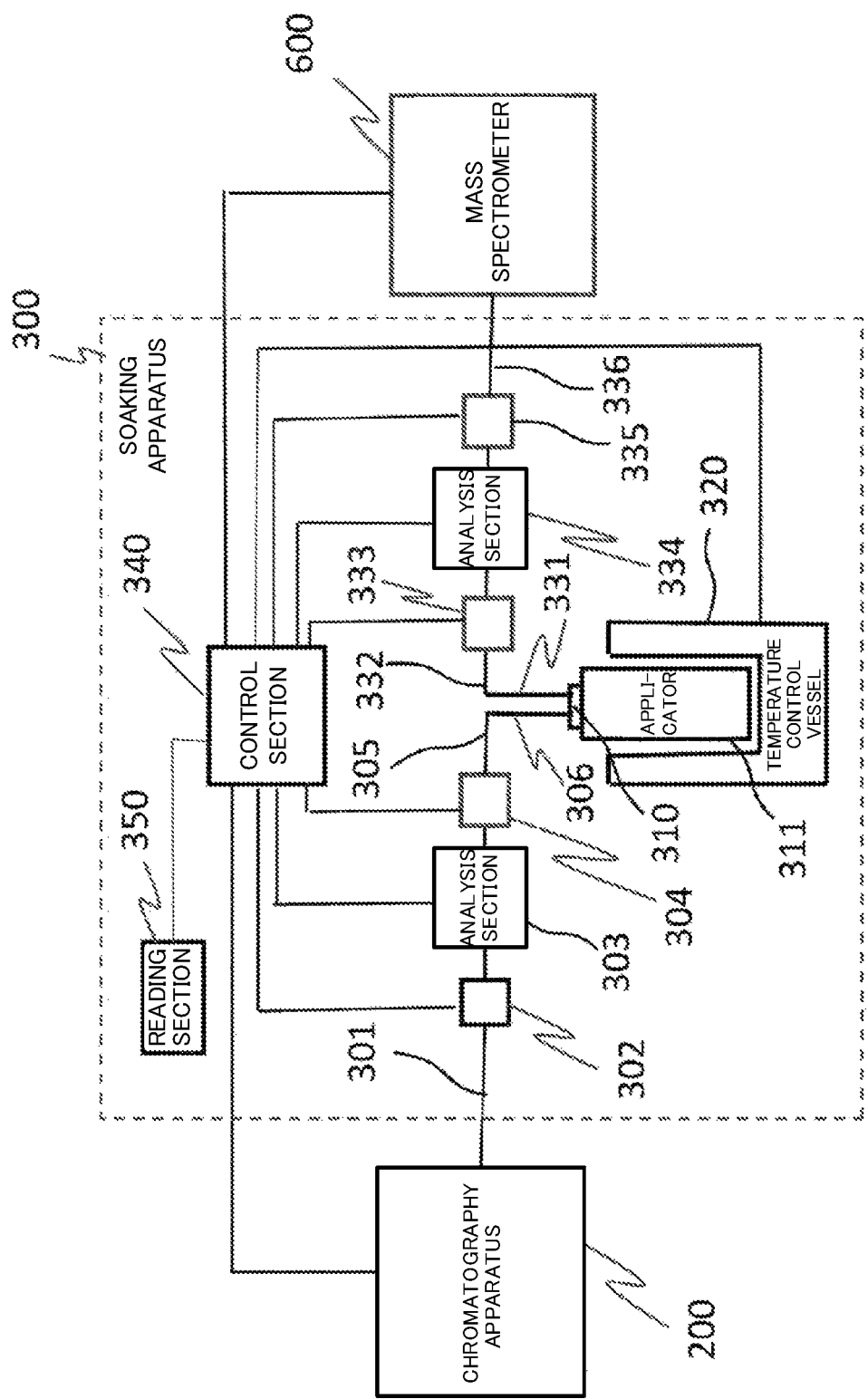
FIG. 8 is a block diagram showing a configuration of a soaking machine of a sample for X-ray structure analysis according to Example according to the present invention.

FIG. 8 is a block diagram showing a configuration of the soaking machine 300 for the single-crystal X-ray structure analysis apparatus 500 relating to Example according to the present invention. The soaking machine 300 relating to the present Example comprises a supply side piping 301, a supply side first actuator 302, a supply side analysis section 303, a supply side second actuator 304, a supply side pipe 305, an injection needle (injection pipe) 306, an applicator 311 into which a sample holder 310 (corresponding to the sample holder 513 in FIG. 3) is attached, a temperature controller (thermostat) 320, a discharge needle (discharge pipe) 331, a discharge pipe 332, a discharge side first actuator 333, a discharge side analysis section 334, a discharge side second actuator 335, a discharge side piping 336, a control section 340, and a reading section 350.

According to the soaking machine 300, a carrier or a solvent (hereinafter, referred to as a sample, inclusive of each of these) containing an analysis object sample (gas, liquid, supercritical fluid, or the like) that has been supplied from a separation apparatus (for example, gas chromatography, liquid chromatography or the like) 200 is supplied through the supply side piping 301, and a flow rate, a pressure and so forth of the sample are adjusted by the supply side first actuator 302.

Figure 9:
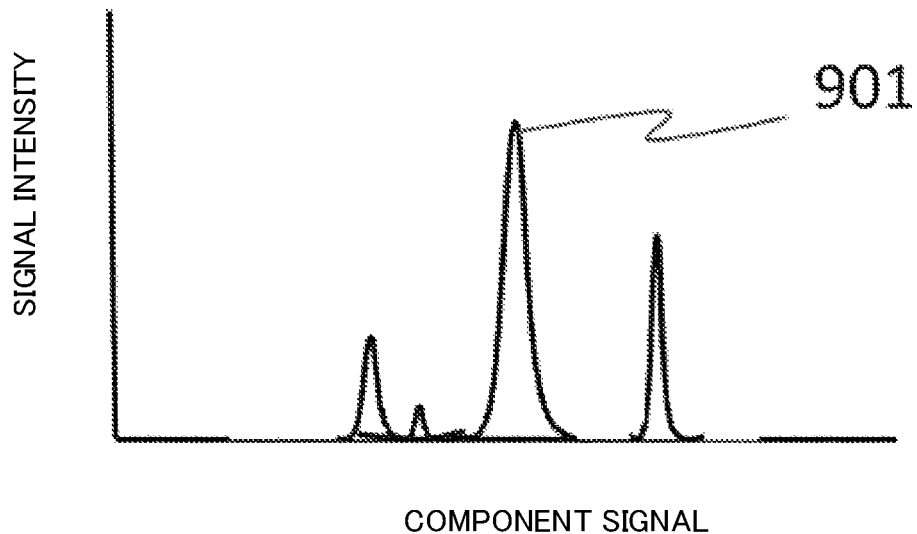
FIG. 9 is a diagram including a graph showing one example of an output waveform of a sensor on the supply side in the above-described soaking machine.

Next, the carrier containing the sample is sent to the supply side analysis section 303, and components of the sample whose pressure, concentration and temperature are adjusted are analyzed. One example of the analysis results is shown in FIG. 9. The graph of FIG. 9 shows that the sample sent from the separation apparatus 200 has a peak 901 in signal intensity at a specific component.

The sample that has been analyzed by the supply side analysis section 303 is sent from the supply side pipe 305 to the injection needle 306 whose tip portion is inserted in the sample holder 310 attached into the applicator 311, and is supplied to the sample holder 310 inside the applicator 311 from the tip portion of the injection needle 306. The injection needle 306 is driven by drive means that is not shown in the figure, and is inserted in the sample holder 310 attached into the applicator 311.

The temperature controller 320 is controlled by the control section 340 in this state, and the applicator 311 is heated or cooled in such a manner that the applicator 311 comprising the sample holder 310 reaches a desired temperature.

An excessive sample out of the sample supplied to the inside of the applicator 311 is discharged via the discharge pipe 332 from the discharge needle 331 inserted into the sample holder 310 whose tip portion is attached into the applicator 311 by operating the discharge side first actuator 333, after elapse of a predetermined time in a state where the sample is injected from the injection needle 306 into the sample holder 310 attached into the applicator 311 whose temperature is controlled by the temperature controller 320. That is, the excessive sample means a sample discharged according to the length of the discharge needle 331. The discharge needle 331 is driven by the drive means that is not shown in the figure, and is inserted into the sample holder 310.

In this manner, the sample is sent to the injection needle 306 on the supply side from the supply side piping, and is supplied to the sample holder 310 inside the applicator 311 from the tip portion of the injection needle 306 on the supply side. Only the sample, or a solution in which the sample and the preserving solvent (carrier) are mixed is supplied by flowing inside the injection needle 306 on the supply side. Accordingly, a very small amount of the sample S introduced thereto comes into contact with the crystalline sponge attached to the tip of the pin-shaped holding part of the sample holder 310 inside the storing space 301 of the applicator 300, and the sample is soaked therein. In addition, examples of the electrophoresis device herein include various electrophoresis devices concerning capillary electrophoresis, isoelectric point electrophoresis, and so forth. When using the soaking machine 300, in a state where the sample is injected there into, the excessive sample or a solution in which the sample and the preserving solvent (carrier) are mixed is discharged from the discharge needle 331 on the discharge side, after a predetermined time has elapsed. When not using the soaking machine 300, the unnecessary preserving solvent (carrier) or solution flows inside the discharge needle 331 on the discharge side, and is discharged. Accordingly, it is possible that no sample flows through the discharge needle 331 on the discharge side. When using gas or supercritical fluid as a carrier, the carrier containing the sample is discharged.

Figure 10:
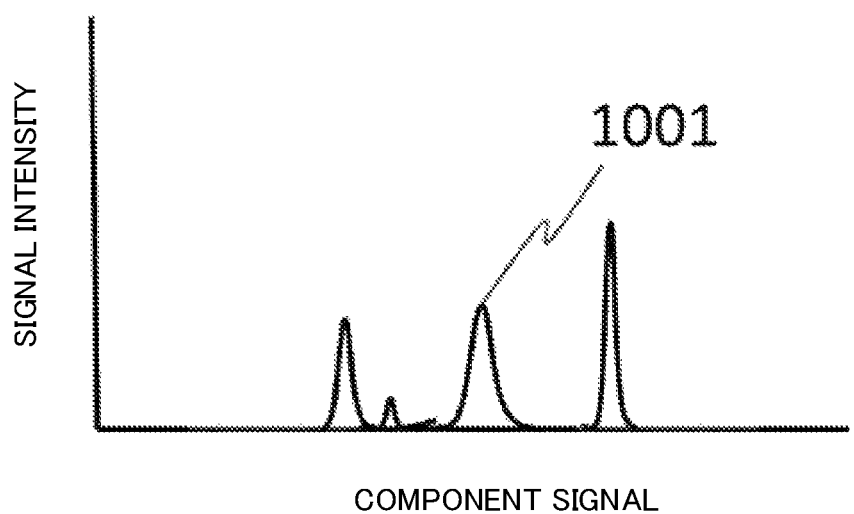
FIG. 10 is a diagram including a graph showing one example of an output waveform of a sensor on the discharge side in the above-described soaking machine.

As to a sample discharged from the inside of the applicator 311 by the discharge side first actuator 333, its component is analyzed by the discharge side analysis section 334. One example of the result obtained by the analysis is shown in FIG. 10. The sample discharged from inside the applicator 311, whose component is analyzed by the discharge side analysis section 334 is sent to a mass spectrometer 600 from the discharge side piping 336 by adjusting a pressure, a flow rate, or a concentration with the discharge side second actuator 335 to analyze the mass component.

Herein, it is understood that the peak 1001 at the component in the graph of FIG. 10, that corresponds to the component signal at which the intensity peak 901 is shown in FIG. 9 is lowered when comparing the graph of FIG. 10 obtained via analysis performed by the discharge side analysis section 334 with the graph of FIG. 9 obtained via analysis performed by the supply side analysis section 303. This means that a part of component at which the peak is shown in FIG. 9 is consumed inside the applicator 311.

It is determined that an analysis object sample is soaked in a crystalline sponge attached to a tip portion of the sample holder 310 attached into the applicator 311 at the time when the difference or ratio between both the peak values becomes a predetermined value by comparing data as shown in the FIG. 9 with data as shown in FIG. 10 via the control section 340, followed by completing a series of operations.

Figure 11:
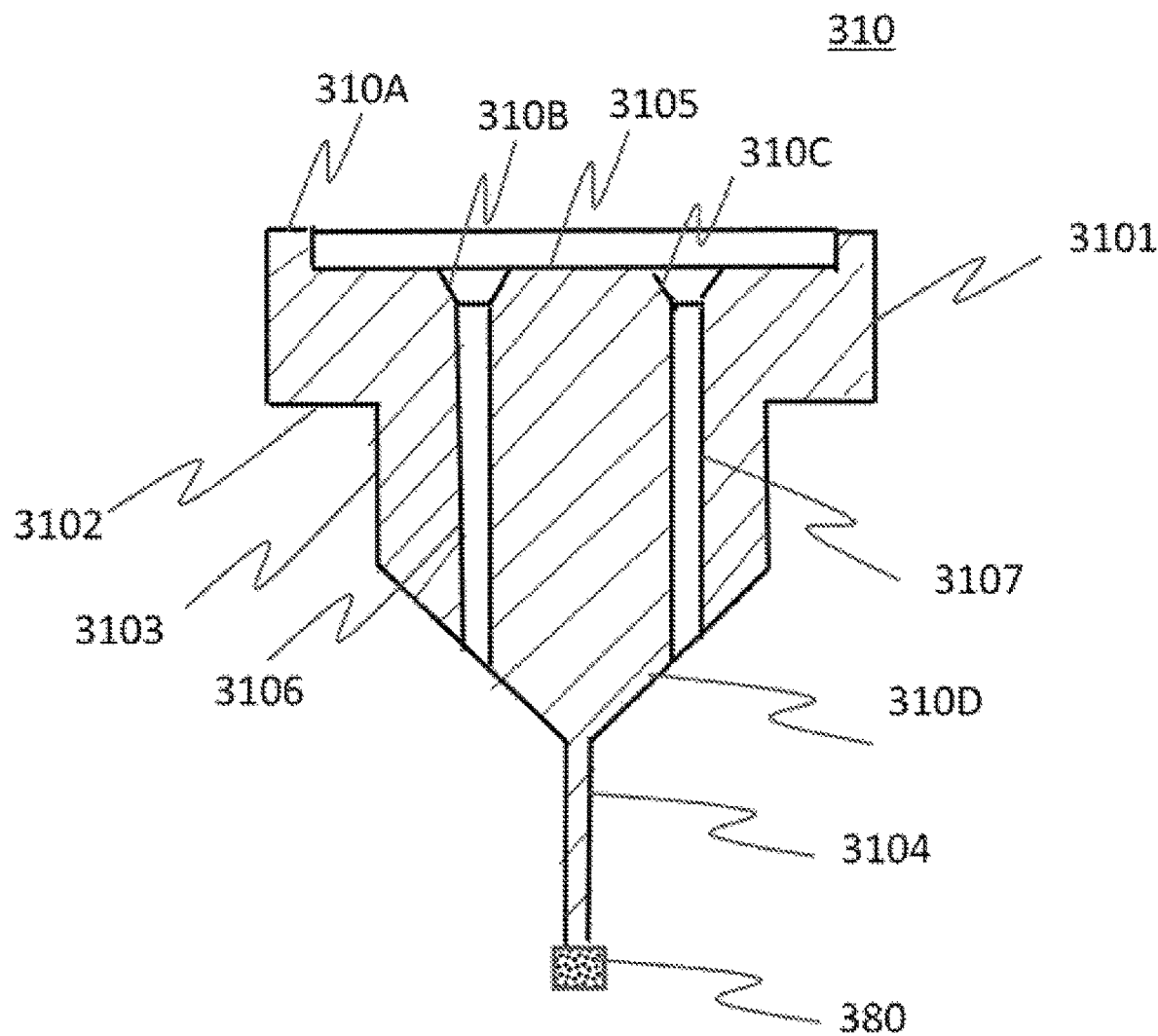
FIG. 11 is a sectional view showing a sample holder used for soaking a sample for X-ray structure analysis in the above-described soaking machine.

A sectional view when the sample holder 310 is viewed from the front surface is shown in FIG. 11. The sample holder 310 is formed with a flat surface 3102 at one end of the base portion 3101 supported by a handling operator. A trunk portion 3103 whose outer diameter is smaller than that of the base portion 3101 is formed at a tip of the flat surface 3102; a guide surface 310D processed into a taper shape is formed at a tip of the trunk portion 3103; and a thin pin 3104 is formed in the tip portion.

A recess portion 3105 as a positioning member for attaching the sample holder to the goniometer head 514 in the single-crystal X-ray structure analysis apparatus 500 is formed to the upper surface 310A of the figure, that is another end surface of the base portion 3101. Further, an injection needle hole 3106 and a discharge needle hole 3107 each passing through the trunk portion 3103 from the base portion 3101 are formed in the sample holder 310.

The taper portions 310B and 310C each processed into a taper shape are formed on the respective end surfaces on the recess portion 3105 side in the injection needle hole 3106 and the discharge needle hole 3107.

The taper portions 310B and 310C become guide surfaces when inserting the injection needle 306 and the discharge needle 331. Further, the area around which the taper surface 310B is formed and the area around which the taper surface 310C is formed out of the recess portion 3105 become seal surfaces when the injection needle 306 and the discharge needle 331 are inserted into the injection needle hole 3106 and the discharge needle hole 3107, respectively, as described later.

The entire sample holder 310 or the recess portion 3105 as a part of the base portion 3101 is formed of a magnetic material for magnetic connection with the magnetic material in the tip portion of the goniometer head 514.

The crystalline sponge 380 in which an analysis sample is soaked is attached (adheres) to the tip portion of the pin 3104. This crystalline sponge 380 is formed of a different component depending on a type of analysis object sample.

Figure 12:
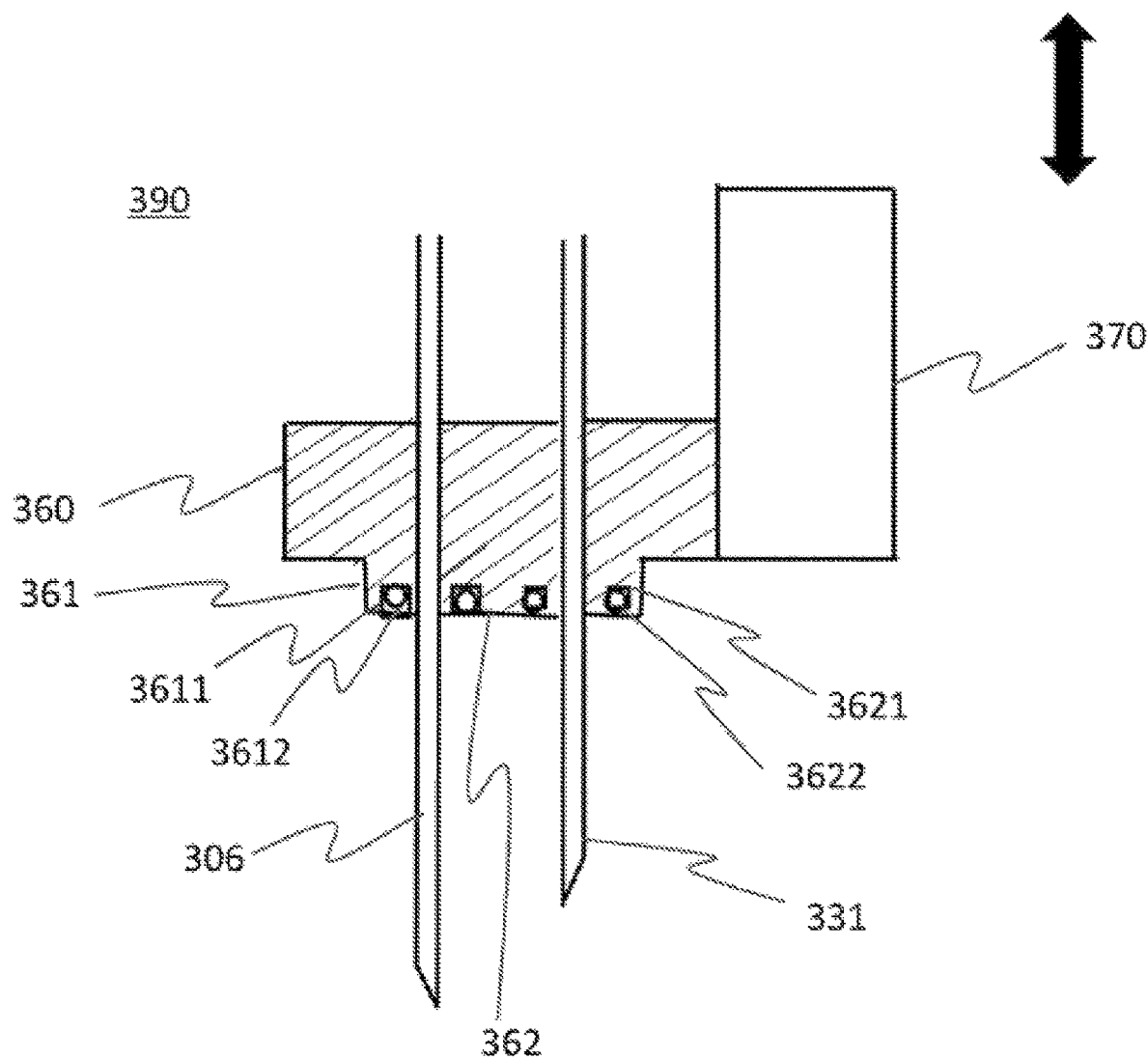
FIG. 12 is a sectional view showing one example of a structure of a needle insertion part where an injection needle and a discharge needle are inserted into a sample holder in the above-described soaking machine.

FIG. 12 shows a sectional view of a needle insertion part 390 where the injection needle 306 and the discharge needle 331 are inserted into the sample holder 310. This needle insertion part 390 comprises a holding block 360 that holds an injection needle 306 and a discharge needle 331, and a drive section 370 that drives the holding block 360 in an upward-downward direction (Refer to an arrow in the figure).

The injection needle 306 and the discharge needle 331 each are closely attached and held to/by the holding block 360 via welding or the like, for example.

A protrusion portion 361 is formed on a tip portion side (lower side in the FIG. 12) of the injection needle 306 and the discharge needle 331 in the holding block 360. Further, grooves 3611 and 3621 for O-ring insertion are formed to an end surface of the protrusion portion 361, and O-rings 3612 and 3622 are attached into the grooves 3611 and 3621, respectively.

Further, an outer diameter dimension of the protrusion portion 361 is formed to be slightly smaller than an inner diameter dimension of the recess portion 3105 formed to the sample holder 310.

The drive section 370 constituted by using for example, an electric motor, or an air cylinder or a hydraulic cylinder and the like drives the holding block 360 in the upward-downward direction, without going into detail.

Figure 13:
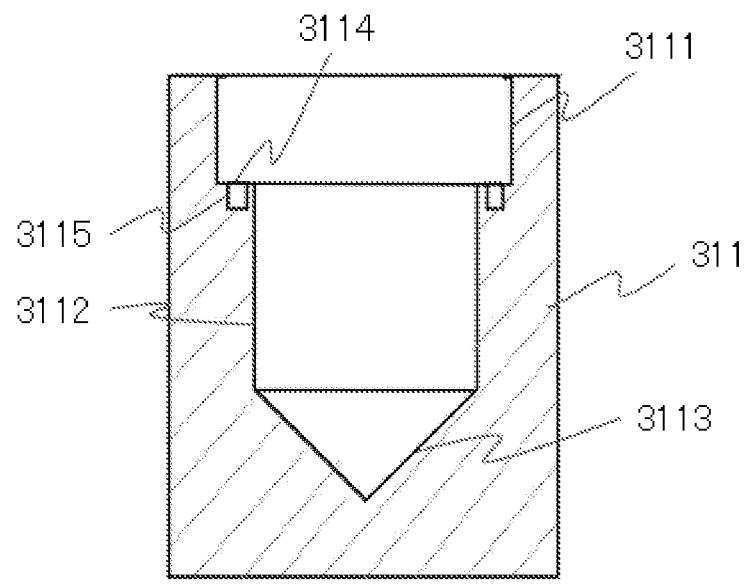
FIG. 13 is a sectional view showing an applicator that stores a sample holder used in the above-described soaking machine.

FIG. 13 shows a cross-section of the applicator 311. An opening 3111 as a portion in which the base portion 3101 of the sample holder 310 is inserted, a cylindrical space portion 3112 in which the trunk portion 3103 of the sample holder 310 is inserted, and a tip space portion 3113 in which the pin 3104 of the sample holder 310 is inserted are formed in the applicator. The tip space portion 3113 in which the pin 3104 is inserted has its diameter becoming smaller toward the tip, thereby having a so-called conical shape. Further, according to the applicator 311, in a state where the sample holder 310 is attached thereto, an O-ring groove 3115 is formed to a surface 3114 brought into contact with the flat surface 3102 of the base portion 3101.

Figure 14:
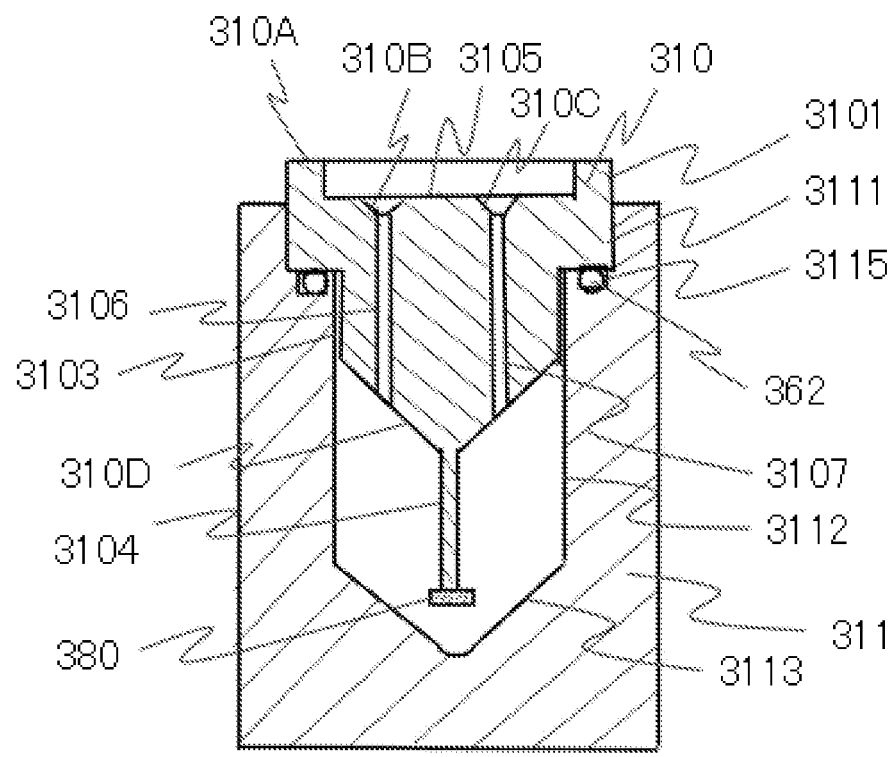
FIG. 14 is a sectional view showing a state where a sample holder used in the above-described soaking machine is stored in the applicator.

FIG. 14 shows a state where the sample holder 310 is attached into the applicator 311. In a state where the crystalline sponge 380 is attached to the tip portion of the pin 3104 of the sample holder 310, the trunk portion 3103 of the sample holder 310 is inserted into the cylindrical space portion 3112 of the applicator 311 with the guide surface processed into a taper shape at the tip of the trunk portion 3103 as a guide.

Further, when pressing the sample holder 310 into the applicator 311, the trunk portion 3103 of the sample holder 310 inserted into the cylindrical space portion 3112 of the applicator 311 becomes a guide to insert the base portion 3101 of the sample holder 310 into the opening 3111 of the applicator 311.

In this manner, the sample holder 310 is attached to the applicator 311; and in a state where the base part 3101 of the sample holder 310 is inserted into the opening 3111 of the applicator 311, the injection needle 306 and the discharge needle 331 are inserted in the injection needle hole 3106 and the discharge needle hole 3107, respectively, to supply a sample into the cylindrical space portion 3112 and the tip space portion 3113 of the applicator 311.

Figure 15:
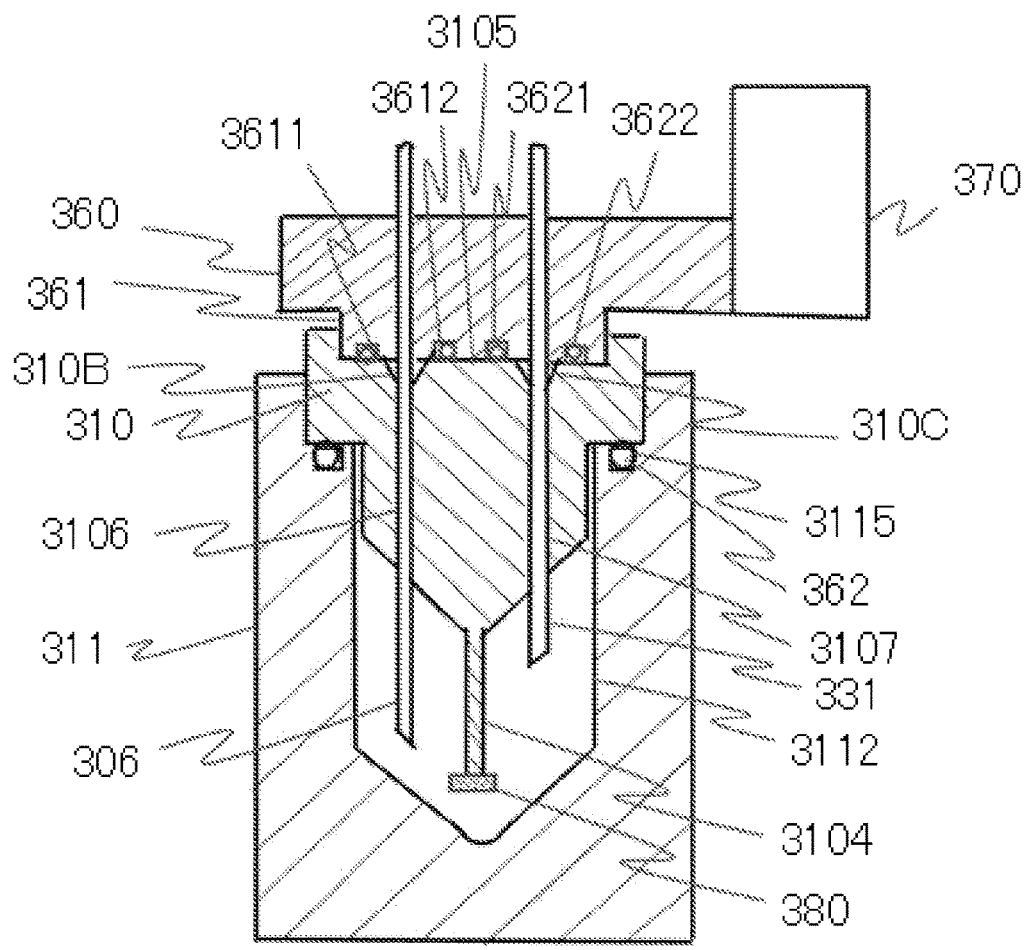
FIG. 15 is a sectional view showing a state where an injection needle and a discharge needle are inserted into the sample holder stored in the applicator, from the needle insertion part, in the above-described soaking machine.

FIG. 15 shows a state where the injection needle 306 and the discharge needle 331 are inserted into the cylindrical space portion 3112 of the applicator 311 from the injection needle hole 3106 and the discharge needle hole 3107. In this state, the applicator 311 is held by holding means that is not shown in the figure, and the posture where the injection needle 306 and the discharge needle 331 are inserted thereinto is kept. The injection needle 306 and the discharge needle 331 are inserted into the injection needle hole 3106 and the discharge needle hole 3107, respectively, by downwardly pressing the holding block 360 that holds these needles by the drive section 370.

As a procedure in which the injection needle 306 is inserted into the injection needle hole 3106, and the discharge needle 331 is inserted into the discharge needle hole 3107, these needles are pressed downward together with the holding block 360 by the drive section 370. Thus, first, the tip portion of the injection needle 306 comes into contact with the taper surface 310B processed into a taper shape at the upper end portion of the injection needle hole 3106 to enter the injection needle hole 3106, and next, the tip portion of the discharge needle 331 comes into contact with the taper surface 310C processed into a taper shape at the upper end portion of the discharge needle hole 3107 to enter the discharge needle hole 3107.

The tip portion of the injection needle 306 moves downward through the inside of the injection needle hole 3106 by continuing the state of being driven by the drive section 370, and reaches the cylindrical space portion 3112 of the applicator 311. Following this, the tip portion of the discharge needle 331 moves downward through the inside of the discharge needle hole 3107, and reaches the cylindrical space portion 3112 of the applicator 311.

When continuing the state of being driven by the drive section 370 even after a tip portion of the injection needle 306 and another tip portion of the discharge needle 331 both reach the cylindrical space portion 3112 of the applicator 311, the protrusion portion 361 of the holding block 360 reaches the recess portion 3105 formed to the sample holder 310.

When continuing this state of being driven by the drive section 370, the sample holder 310 is pressed onto the applicator 311 side, and an O-ring 362 attached into an O-ring groove 3115 is pressed to ensure sealing between the sample holder 310 and the applicator 311.

Further, the O-ring 3612 attached into the O-ring groove 3611, and the O-ring 3622 attached into the O-ring groove 3621 that are formed to the protrusion portion 361 of the holding block 360 each are pressed by the recess portion 3105 of the sample holder 310. By this, sealing is ensured between the holding block 360 and the sample holder 310.

By having such a configuration, the cylindrical space portion 3112 inside the applicator 311 into which the sample holder 310 is attached, that is, the space surrounded by the sample holder 310 and the applicator 311 can be made to maintain an airtight state to the outside.

In this state, the control section 340 shown in FIG. 8 controls the supply side first actuator 302, the supply side analysis section 303, the supply side second actuator 304 and the temperature controller 320 to supply a sample fed from the chromatography apparatus 200 into the cylindrical space portion 3112 and its tip space portion 3113 of the applicator 311 from the injection needle 306.

Further, the control section 340 controls the discharge side first actuator 333, the discharge side analysis section 334 and the discharge side second actuator 335 to discharge an excessive sample out of the sample supplied to the inside of the cylindrical space portion 3112 of the applicator 311 from the discharge needle 331.

Further, the control section 340 accelerates soaking of a sample in the inside of the crystalline sponge 380 by controlling the temperature controller 320 in a state where the sample is supplied into the cylindrical space portion 3112 and its tip space portion 3113 of the applicator 311.

In this manner, the control section 340 controls the drive section 370 to raise the holding block 360 after it is confirmed from data given from the supply side analysis section 303 and the discharge side analysis section 334 that the sample is soaked in the crystalline sponge 380 by controlling/maintaining the temperature of the applicator 311 with the temperature controller 320 by a prescribed time. By this, the injection needle 306 and the discharge needle 331 are removed from the injection needle hole 3106 and the discharge needle hole 3107 that are formed in the sample holder to end a step of soaking the sample in the crystalline sponge.

In addition, in the configuration shown in FIG. 12 as well as FIG. 15, the injection needle 306 whose tip portion (on the lower side in FIGS. 12 and 15) protrudes from the holding block 360 has a so-called longer shape in length than that of the discharge needle 331. However, in contrast, there are some cases where namely, the discharge needle 331 whose tip portion protrudes from the holding block 360 has a longer shape in length than that of the injection needle 306, depending on a type of the handling sample.

In addition, the state shown in this FIG. 15 shows a state where the injection needle 306 and the discharge needle 331 that are shown in the above-described FIG. 8 are inserted into the sample holder 310 and the applicator 311. However, in FIG. 8, displaying the holding block 360 and the drive section 370 is omitted.

In addition, according to the configuration shown in FIG. 8, the mass spectrometer 600 is described as a different configuration from the soaking machine 300, but may be regarded as part of the soaking machine 300 by integrating the mass spectrometer 600 into the soaking machine 300.

Figure 16:
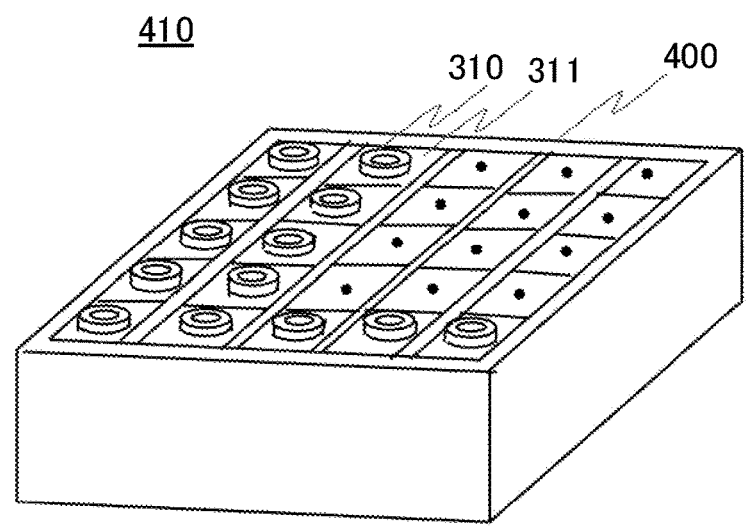
FIG. 16 is a perspective view showing a sample tray in which a plurality of applicators each into which a sample holder is attached are stored in the above-described soaking machine, the sample holder at whose tip portion a crystalline sponge is attached.

A perspective view of a sample tray (well plate) 410 in a state where a plurality of applicators 311 each into which a sample holder 310 is attached are stored inside a tray 400, the sample holder at the tip portion of which a crystalline sponge where a sample is soaked is included, is shown in FIG. 16 according to the soaking machine 300 relating to the present Example. The plurality of applicators 311 each into which the sample holder 310 is attached are stored in the sample tray 410, but color of the applicator 311 is differentiated depending on a type of the crystalline sponge 380 in which a sample is soaked, and thus the type of sample soaked in the crystalline sponge 380 can be easily determined.

According to the present Example, the sample can be safely soaked into a very small and fragile crystalline sponge 380 attached to the tip potion of the pin 3104 of the sample holder 310 in a state where the sample holder 310 is attached into the applicator 311.

Further, according to the present Example, the control section 340 controls the supply side first actuator 302, the supply side analysis section 303 and the supply side second actuator 304; the discharge side first actuator 333, the discharge side analysis section 334 and the discharge side second actuator 335; and further, the temperature controller 320 to soak the sample into the crystalline sponge 380, and thus it becomes easier to set a soaking condition of an analysis object sample than the case where soaking of the sample is carried out by a conventionally manual operation.

Further, according to the present Example, it can be easily confirmed by the control section 340 that a single-crystal of the sample is formed inside the crystalline sponge 380 by comparing data obtained via analysis at the supply side analysis section 303 with data obtained via analysis at the discharge side analysis section 334.

In addition, though various Examples according to the present invention are described above, the present invention is not limited to the above-described Examples and includes various modified examples. For example, the above-described Examples describe the entire system in detail in order to facilitate understanding of the present invention, but are not necessarily limited to those having all the configurations that have been described. Further, part of a configuration of one Example may be replaced with a configuration of another Example; further, a configuration of another Example may also be added to a configuration of one Example; and with respect to a part of a configuration of each Example, further performed may be addition/deletion/replacement of another configuration.

The present invention is widely applicable for a searching method of a material structure, an X-ray structure analysis apparatus used for the same, and so forth.

In addition, the present international application claims priority under Japanese Patent Application No. 2018-219811, filed Nov. 23, 2018, and the entire content of Japanese Patent Application No. 2018-219811 is applied to the present international application.

EXPLANATION OF THE SYMBOLS

100 . . . Single-crystal X-ray structure analysis system; 200 . . . Chromatography apparatus; 300 . . . Soaking machine for single-crystal X-ray structure analysis apparatus; 302 . . . Supply side first actuator; 303 . . . Supply side analysis section; 304 . . . Supply side second actuator; 306 . . . Injection needle; 310 . . . Sample holder; 311 . . . Applicator; 320 . . . Temperature controller; 333 . . . Discharge side first actuator; 334 . . . Discharge side analysis section; 335 . . . Discharge side second actuator; 340 . . . Control section; 360 . . . Holding block; and 370 . . . Drive section.

The invention claimed is:
1. A soaking machine for soaking a sample, the soaking machine comprising:
   a supply section that supplies the sample to a porous complex crystal held by a sample holder,
   a temperature control section that controls a temperature of the porous complex crystal,
   a drive section that drives the supply section, and
   a control section that controls the supply section, the temperature control section and the drive section.
2. The soaking machine according to claim 1,
   wherein the sample holder is set in the soaking machine in a state where the sample holder is attached to an applicator;
   the supply section supplies the sample to the porous complex crystal held by the sample holder inside the applicator; and
   the temperature control section controls the temperature of the porous complex crystal held by the sample holder, inside the applicator into which the sample is supplied.
3. The soaking machine according to claim 2,
   wherein the supply section comprises an injection pipe through which the sample is injected into the applicator to which the sample holder is attached;
   the soaking machine further comprises a discharge section that discharges part of the sample from an inside of the applicator to which the sample holder is attached, through a discharge pipe; and
   the drive section drives the injection pipe and the discharge pipe to insert/eject the injection pipe and the discharge pipe to/from the inside of the applicator.
4. The soaking machine according to claim 3,
   wherein the drive section inserts the injection pipe to the applicator through a first through-hole formed in the sample holder, and inserts the discharge pipe to the applicator through a second through-hole formed in the sample holder.
5. The soaking machine according to claim 4,
   wherein the injection pipe and the discharge pipe each have a different insertion depth into the sample holder, from each other in a state where the injection pipe and the discharge pipe are inserted to the applicator.
6. The soaking machine according to claim 5,
   wherein a taper-shaped surface is formed at an end portion on a side where the injection pipe or the discharge pipe is inserted/ejected thereinto/therefrom, for each of the first through-hole and the second through-hole, and
   the drive section inserts the injection pipe from the side where the taper-shaped surface of the first-through hole and inserts the discharge pipe from the side where the taper-shaped surface of the second-through hole.
7. The soaking machine according to claim 5,
   wherein the applicator comprises a first seal part for sealing between the applicator and the sample holder;
   the drive section comprises a holding part that holds the injection pipe and the discharge pipe; and
   the holding part comprises a second seal part for sealing between the holding part and the sample holder around the injection pipe, and a third seal part for sealing between the holding part and the sample holder around the discharge pipe.
8. The soaking machine according to claim 4,
   wherein a taper-shaped surface is formed at an end portion on a side where the injection pipe or the discharge pipe is inserted/ejected thereinto/therefrom, for each of the first through-hole and the second through-hole, and
   the drive section inserts the injection pipe from the side where the taper-shaped surface of the first-through hole and inserts the discharge pipe from the side where the taper-shaped surface of the second-through hole.
9. The soaking machine according to claim 8,
   wherein the applicator comprises a first seal part for sealing between the applicator and the sample holder;
   the drive section comprises a holding part that holds the injection pipe and the discharge pipe; and
   the holding part comprises a second seal part for sealing between the holding part and the sample holder around the injection pipe, and a third seal part for sealing between the holding part and the sample holder around the discharge pipe.
10. The soaking machine according to claim 4,
    wherein the applicator comprises a first seal part for sealing between the applicator and the sample holder;
    the drive section comprises a holding part that holds the injection pipe and the discharge pipe; and
    the holding part comprises a second seal part for sealing between the holding part and the sample holder around the injection pipe, and a third seal part for sealing between the holding part and the sample holder around the discharge pipe.
11. The soaking machine according to claim 3,
    wherein the applicator comprises a first seal part for sealing between the applicator and the sample holder;
    the drive section comprises a holding part that holds the injection pipe and the discharge pipe; and
    the holding part comprises a second seal part for sealing between the holding part and the sample holder around the injection pipe, and a third seal part for sealing between the holding part and the sample holder around the discharge pipe.
12. The soaking machine according to claim 11,
    wherein the holding part is formed from a holding block; and
    the inside of the applicator is made airtight by operating the first seal part, the second seal part and the third seal part while inserting the injection pipe and the discharge pipe that are held by the holding block, to the applicator, by driving the holding block in a direction approaching the sample holder with the drive section.
13. The soaking machine according to claim 11,
    wherein the first seal part, the second seal part and the third seal part are O-rings.
14. The soaking machine according to claim 13,
    wherein the O-rings that form the first seal part, the second seal part and the third seal part are pressed by pressing the holding part onto the sample holder with the drive section to secure air-tightness between the applicator and the sample holder, and between the sample holder and the holding part.
15. A soaking method for soaking a sample, the soaking method comprising:
    setting an applicator to which a sample holder that holds a porous complex crystal is attached, in a soaking machine;
    lowering a holding block that holds an injection pipe and a discharge pipe, with a drive section of the soaking machine to insert the injection pipe and the discharge pipe in a first through-hole and a second through-hole, respectively, that are formed in the sample holder, and exposing the injection pipe and the discharge pipe to a region surrounded by the sample holder and the applicator;

pressing the holding block to the sample holder while pressing the sample holder to the applicator by further lowering the holding block with the drive section to secure air-tightness;

supplying the sample into the region surrounded by the sample holder and the applicator, through the injection pipe, the region that is made airtight;

soaking the sample in the porous complex crystal with controlling a temperature of the applicator to which the sample is supplied, with the temperature control section, depending on a type of the sample; and discharging, from the region surrounded by the sample holder and the applicator, the sample supplied thereto, through the discharge pipe.

16. The soaking method according to claim 15, wherein in the step of securing the air-tightness, the air-tightness between the sample holder and the applicator is secured by pressing the seal part attached onto a side of the applicator with the sample holder.

17. The soaking method according to claim 16, wherein in the step of securing the air-tightness, the air-tightness by sealing between the holding block and the sample holder is secured by pressing the seal parts attached to a region where the injection pipe is surrounded and another region where the discharge pipe is surrounded on the holding block side, onto the sample holder.

18. The soaking method according to claim 15, wherein in the step of securing the air-tightness, the air-tightness by sealing between the holding block and the sample holder is secured by pressing the seal parts attached to a region where the injection pipe is surrounded and another region where the discharge pipe is surrounded on the holding block side, onto the sample holder.

* * * * *